March 28, 1967 R. M. A. T. DE MONTIGNY ETAL 3,311,533
APPARATUS FOR MAKING FORMED FIBROUS WEBS Filed April 6, 1964 7 Sheets-Sheet 1

Inventor
Raimbault M. A. T. de Montigny
Joseph A. Lapointe
John G. Buchanan
By Stevens, Davis, Miller & Mosher
Attorneys March 28, 1967 R. M. A. T. DE MONTIGNY ETAL 3,311,533
APPARATUS FOR MAKING FORMED FIBROUS WEBS
Filed April 6, 1964 7 Sheets-Sheet 2

Inventor
Raimbault M. A. T. de Montigny
Joseph A. Lapointe
John G. Buchanan
By Stevens, Davis, Miller & Mosher
Attorneys March 28, 1967    R. M. A. T. DE MONTIGNY ETAL    3,311,533
APPARATUS FOR MAKING FORMED FIBROUS WEBS
Filed April 6, 1964                      7 Sheets-Sheet 7

Inventors
Raimbault M.A.T. de Montigny
Joseph A. Lapointe
John G. Buchanan
By Stevens, Davis, Miller & Mosher
Attorneys United States Patent Office 3,311,533
Patented Mar. 28, 1967

3,311,533
APPARATUS FOR MAKING FORMED FIBROUS
WEBS
Raimbault M. A. T. de Montigny, Baie d'Urfe, Quebec, and Joseph A. Lapointe and John G. Buchanan, Pointe Claire, Quebec, Canada, assignors to Pulp and Paper Research Institute of Canada, Montreal, Quebec, Canada
Filed Apr. 6, 1964, Ser. No. 357,410
Claims priority, application Canada, Apr. 29, 1963, 874,330
9 Claims. (Cl. 162—203)

This invention relates to a method and apparatus for making formed fibrous webs and is particularly applicable to the production of paper.

In the prior Canadian Patent 622,111, dated June 13, 1961 (corresponding U.S. Patent No. 2,995,186 dated August 8, 1961) covering an invention by Raimbault M. A. T. de Montigny, one of the inventors of the present invention, a cylinder machine is described in which first, second and third zones are located in the periphery of a cylinder having a foraminous surface and enveloped by a foraminous band. In the first zone water is expressed predominantly outwardly but partially inwardly. In the second zone, an outwardly acting air flow at a relatively low pressure differential is established to displace water through the foraminous band without separating the web from the cylinder. In this second zone the water which was expressed inwardly in the first zone is displaced outwardly and additional water is extracted from the web. In the third zone an air flow at a relatively high pressure differential acts inwardly with respect to the cylinder. While an apparatus in accordance with such prior invention largely overcomes the disadvantages of conventional Fourdrinier and cylinder machines it has the disadvantage that water expressed inwardly in the first zone is displaced outwardly in the second zone with a consequent loss of maximum efficiency.

The object of this invention is to provide an improved apparatus capable of high speed operation and efficient dewatering and yet which avoids the disadvantage referred to above.

In accordance with this invention, first and second continuous foraminous bands converge to provide an entrance nip for the reception of stock. In a first zone water is expressed in one direction and is collected in a suitable receptacle and water is expressed in the other direction into a foraminous cylinder which stores the water and transfers it to a location remote from the bands where the water is removed from the foraminous cylinder to a suitable receptacle, the foraminous bands travel in contact with each other to a second zone in which the bands are in contact with the periphery of a second foraminous cylinder and in which there is an outwardly acting air flow at a relatively low pressure differential and a third zone in which there is an inwardly acting air flow at a high pressure differential and in which at least one of the bands are contacted against a foraminous cylinder which is the same as or different from the second foraminous cylinder.

In the drawings illustrating the preferred embodiments of the invention:

Figure 1:
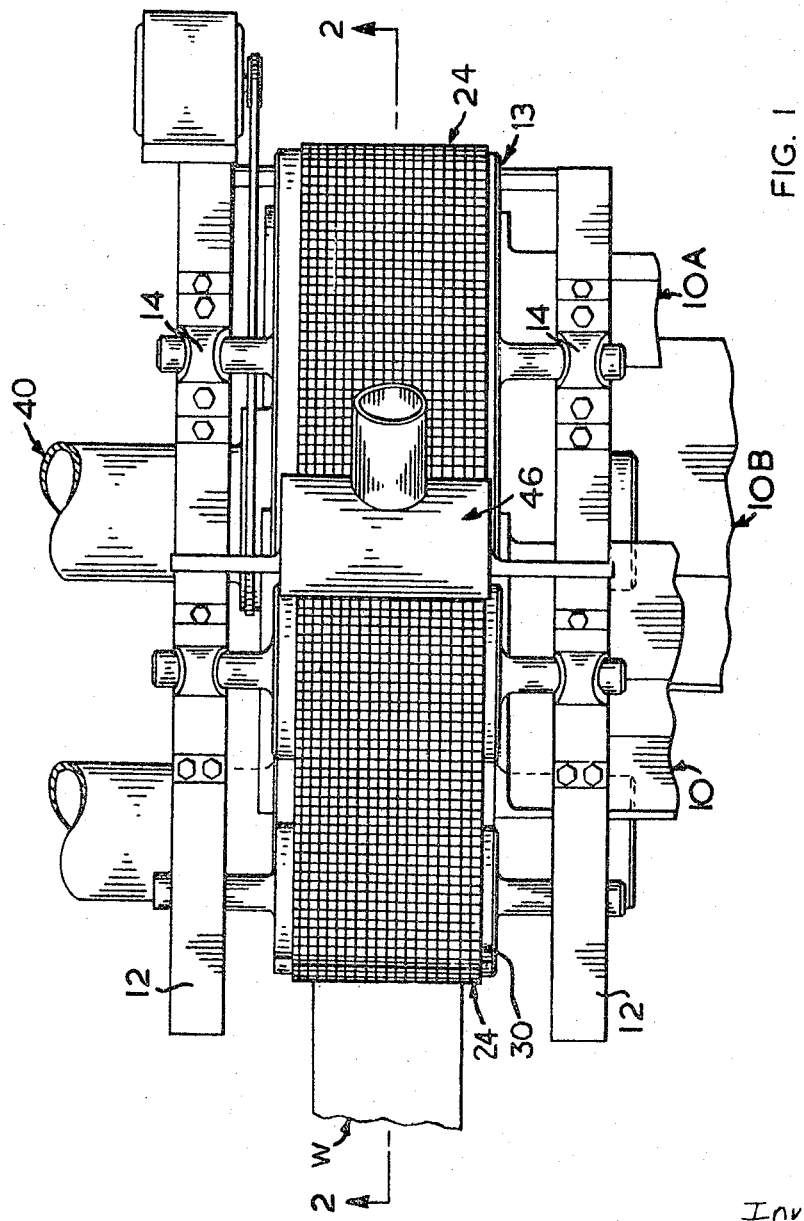
FIGURE 1 is a plan view of an apparatus in accordance with this invention.
Figure 2:
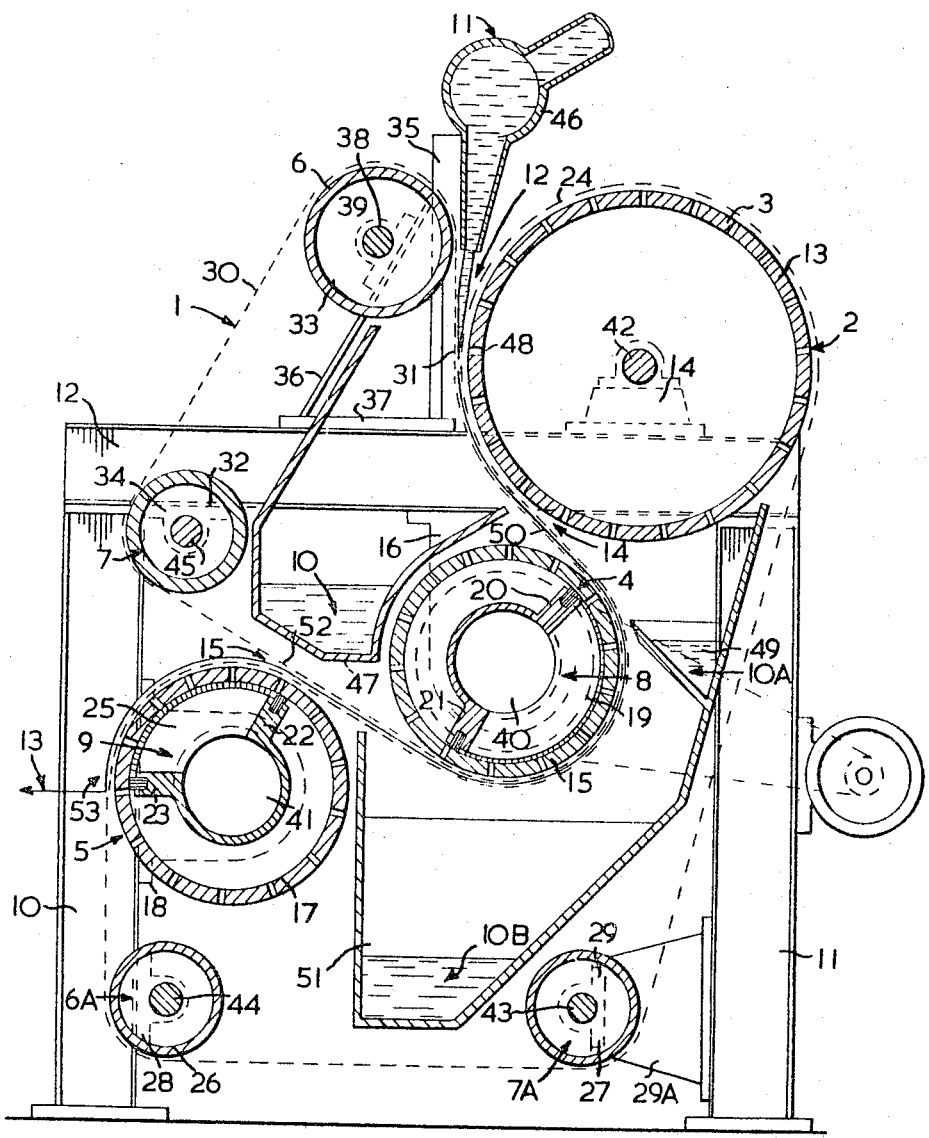
FIGURE 2 is a sectional elevation view on the line 2—2 of FIGURE 1.
Figure 3:
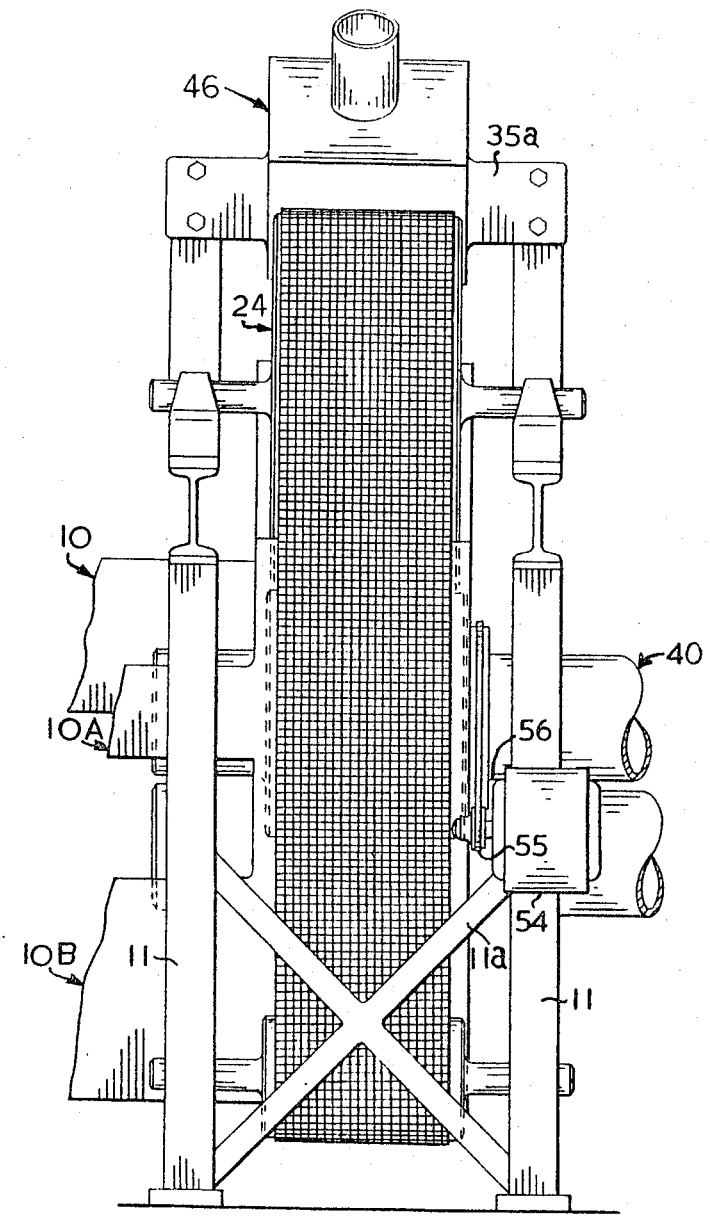
FIGURE 3 is an end elevation view of the apparatus shown in FIGURES 1 and 2.

Referring now to FIGURES 1, 2 and 3 of the drawings, the supporting framework includes upright members 10 and 11 which support beams 12. Braces such as 11a rigidify the framework. A first foraminous cylinder 13 is mounted on beam 12 by journals 14. A second foraminous cylinder 15 is mounted on supports 16 which depend from beam 12. A third foraminous cylinder 17 is mounted on supports 18 which extend laterally from upright member 10. Cylinder 15 includes a pressure box 19 defined by radial partitions 20 and 21. Cylinder 17 includes a suction box 25 defined by radial partitions 22 and 23.

A first foraminous band 24 encircles part of the periphery of cylinder 13 and then passes successively around the part of the periphery of cylinder 15 occupied by pressure box 19 and the part of the periphery of cylinder 17 occupied by suction box 25 and from thence around guide rolls 26 and 27 which are mounted by journals 28 and 29 respectively and back to cylinder 13. Journal 29 has a supporting block 29a.

A second foraminous band 30 converges as nip 31 with band 24 and travels with it around parts of the peripheries of cylinders 13 and 15 and then passes around guide rolls 32 and 33. Guide roll 32 is mounted by journals 34 which depend from beam 12 and a support including upright member 35, crossbar 35a and inclined member 36 mounted by base 37 on beam 12 carries journal 38. Journal 38 receives the shaft 39 of the roll 33.

Cylinder 15 has a hollow shaft 40 to enable air pressure to be supplied to pressure box 19 and cylinder 17 has a hollow shaft 41 to enable suction box 25 to be evacuated. Shafts 42, 43, 44 and 45 are provided for cylinder 13 and rolls 27, 26 and 32 respectively.

Headbox 46 mounted on crossbar 35a supplies pulp to the nip 31. The pulp travels between bands 24 and 30 through a first zone in which bands 24 and 30 travel around part of the periphery of cylinder 13. In this first zone part of the water is expressed outwardly through band 30 and is received by trough 47 and part of the water is expressed inwardly into the openings 48 in foraminous cylinder 13. The water which has been received within the openings 48 is flung by centrifugal force into trough 49. The partially dewatered web remains sandwiched between bands 24 and 30 throughout the connecting portion 50 between cylinders 13 and 15. As the web, still sandwiched between bands 24 and 30 travels around pressure box 19 it is subjected to air at a pressure differential within the range of about one tenth to one-half of an atmosphere and preferably about a quarter of an atmosphere. The pressure differential is selected so as to be insufficient to lift the bands 24 and 30 away from the surface of cylinder 15. Water removed by pressure box 19 is collected by trough 51. The further dewatered web then passes to the third zone provided by suction box 25 which additionally dries the web and also ensures that at the point of divergence 52 between bands 24 and 30 the web follows band 24. In suction box 25 a higher pressure differential is established of about one quarter of an atmosphere and preferably three quarters of an atmosphere. It is preferred that the difference between the pressure differential in the second and third zones be of the order of half an atmosphere. The web is stripped from band 24 at 53 by simple tension or a known vacuum transfer device.

A suitable means is provided for driving the cylinders, rolls and bands which have been referred to such as motor 54 which drives cylinder 15 through pulley 55 and belt 56.

A large part of the water in the slurry fed to the machine can be drained very rapidly under low pressure differential. It is desirable to carry out this intial drainage gently, otherwise fine particles in the slurry are forced through the first tenuous layer of fibres formed on the foraminous belts and the retention of such fine particles is therefore poor. Moreover, if drainage is rapid, fibres are rammed into the openings in the formaminous belts and the final web will retain the pattern of these openings; this undesirable pattern is characteristic of paper made on high speed Fourdrinier machines under conditions of forced drainage and is known as "wire mark." For these reasons, it is desirable to carry belt 30 under relatively low tension, preferably in the range of about 10 to about 30 lbs. per inch of width, and thus to subject the slurry in the first zone of confinement to gentle squeezing pressure and gradual drainage.

Conversely, in the second zone of confinement about cylinder 15, the now partially consolidated web can be subjected to considerably higher squeezing pressure without deleterious effect. Moreover the web and its confining belts 24 and 30 are now subjected to the outward thrust of the compressed air issuing from pressure box 19, tending to lift the belts and web off the surface of the cylinder. To prevent this and allow the use of an effectively high pneumatic pressure in pressure box 19 the tension in belt 24 is therefore carried at an appreciably higher level than that of belt 24 and preferably in the range from about 30 lbs. per inch of width to the safe continuous working tension of the material of the belt.

Optimum diameters for the three foraminous cylinders 13, 15 and 17 are governed, in any one machine, by several factors such as structural rigidity, belt tensions, machine speed, and the drainage characteristics of the slurry. It is therefore possible to indicate only approximate ranges for these cylinder diameters. It is envisaged that the diameter of cylinder 13 would range from 30 to 60 inches, cylinder 15 from 24 to 48 inches and cylinder 17 from 30 to 60 inches. It should be emphasized that these are to be construed as approximate and not limiting ranges.

Figure 4:
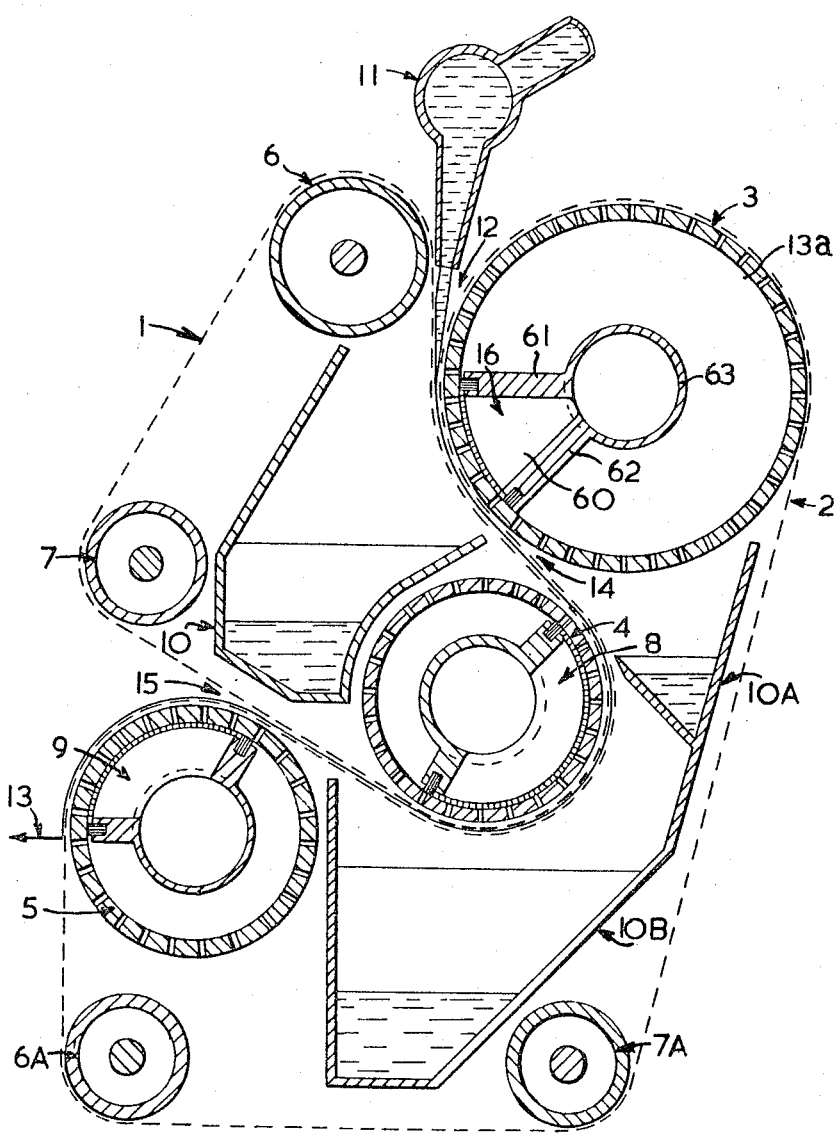
FIGURE 4 is a sectional elevation view illustrating an alternative embodiment of the invention.

The embodiment illustrated in FIGURE 4 is in all respects the same as that illustrated in FIGURES 1 to 3 with the exception noted below and like numbers designate like parts. The exception is that a pressure or suction chamber has been introduced into cylinder 13a. Pressure or suction chamber 60 is defined by radial partitions 61 and 62 and is supplied with air or evacuated through hollow shaft 63 which replaces shaft 42 of FIGURES 1 to 3. Pressure chamber 60 gives added flexibility of control in that inward drainage can be repressed by maintaining super-atmospheric pressure in chamber 60, by maintaining chamber 60 at sub-atmospheric pressure inward drainage is enhanced. Means (not shown) are provided to control the pressure in chamber 60 in the range of one twentieth to one quarter atmosphere above atmospheric and the same range under atmospheric.

Figure 5:
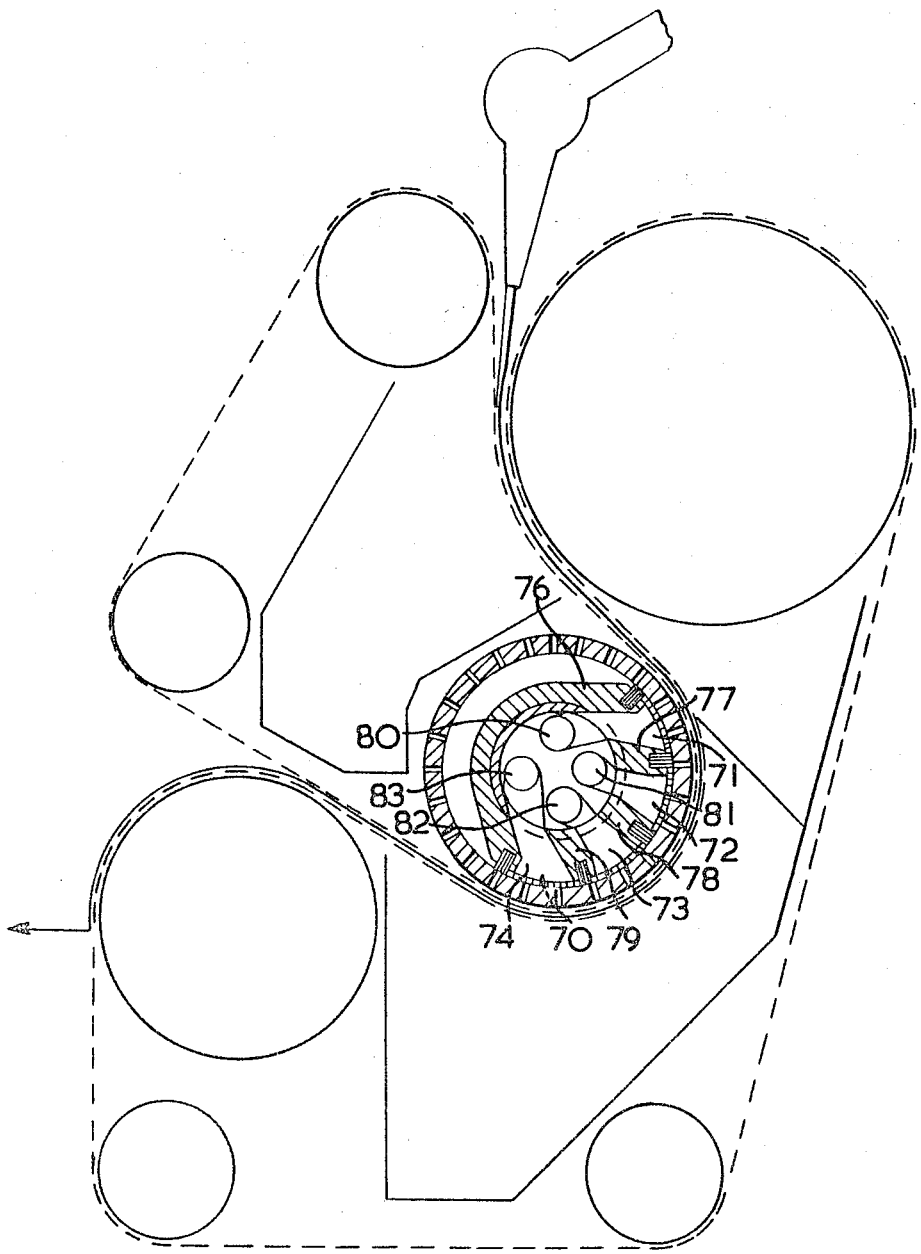
FIGURE 5 is a sectional elevation view illustrating another alternative embodiment of the invention.

FIGURE 5 shows the same apparatus as FIGURES 1 to 3 with like parts being given like numbers but the single pressure chamber 19 of FIGURES 1 to 3 has been replaced by a multiple pressure chamber 70 having compartments 71, 72, 73 and 74 defined by partitions 76, 77, 78 and 79 and supplied with compressed air through ports 80, 81, 82 and 83.

Four such chambers have been shown in FIGURE 5 but their number may range from two to six or more. This provision of multiple pressure chambers imparts great flexibility of operation of the apparatus. Two extreme conditions of operation will be illustrated. When the heavy web of low permeability is being made from fibres from which water drains with difficulty, all boxes are operated at the maximum pressure allowed by the tension in belt 24 and the radius of cylinder 15. When a light, porous web is being made from fibres from which water drains easily, a gradation of increasing pressures is used from the first chamber to the last, thus ensuring gentle treatment of the delicate web and economy of compressed air.

Figure 6:
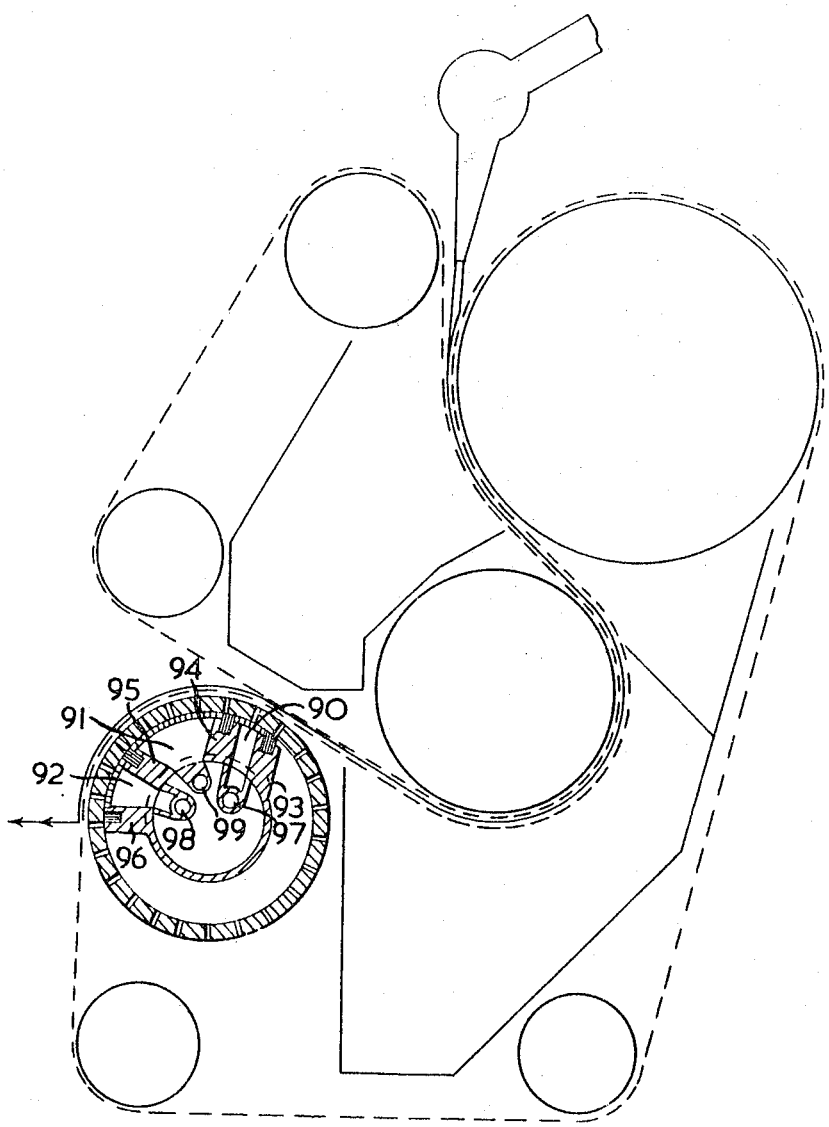
FIGURE 6 is a sectional elevation view illustrating another alternative embodiment of the invention.

FIGURE 6 shows the same apparatus as in FIGURES 1 to 3 in which the single vacuum chamber 25 has been replaced by a plurality of vacuum chambers. Three such chambers 90, 91 and 92 have been shown in FIG. 6 although, exceptionally, more may be used or chamber 90 may be omitted.

Chambers 90, 91 and 92 are defined by partitions 93, 94, 95 and 96, chamber 90 is evacuated through port 97 chamber 91 through port 99 and chamber 92 through port 98. The preferred construction is that shown in FIG. 6 in which chamber 90 is a narrow chamber located at or close to the point where belt 24 is separated from the web and serves the purpose of ensuring that the web will adhere to belt 24 and of eliminating the risk of the web following belt 30. Chamber 90 need be operated only at the minimum vacuum necessary to effect positive transfer of the web and normally in the range of one-tenth to one-third of one atmosphere. Chamber 91 serves the purpose of preventing the web being flung off belt 24 by centrifugal action; at low and moderate speeds of operation, no vacuum is necessary, the adhesion of the web to belt 24 being sufficient to carry the web around cylinder 17 at higher speeds the vacum needed to overcome centrifugal action ranges from one-twentieth to one-third of one atmosphere. Chamber 92 is operated under relatively high vacuum in the range of one-third to one atmosphere, and serves the purpose of removing further water from the web. It will be apparent that the various elements added to the basic apparatus of FIGS. 1 to 3 in FIGS. 4, 5 and 6 may be used together in any combination desired in any one apparatus.

Figure 7:
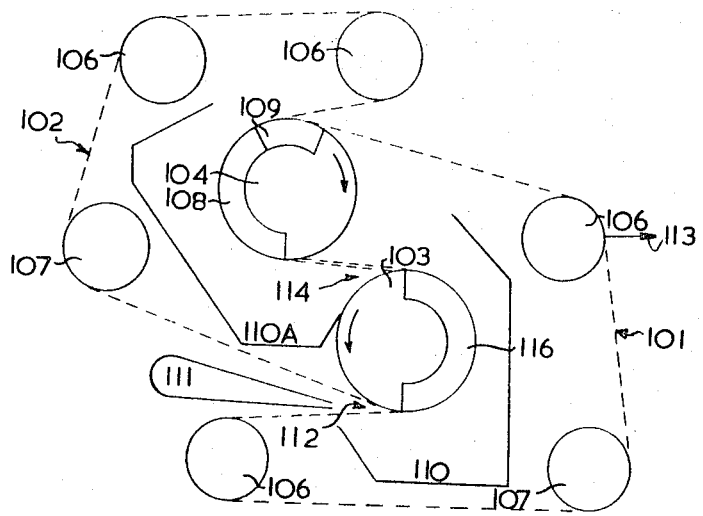
FIGURE 7 is a sectional elevation view illustrating a further alternative embodiment of the invention.

In the embodiment illustrated in FIGURE 7, 101 and 102 are tensioned foraminous belts, 103 and 104 are foraminous cylinders, 106 are turning rolls, 107 are tensioning rolls, 108 is a stationary chamber in sliding contact with the inner periphery of cylinder 104 and connected to a source of compressed air not shown, 109 is a stationary chamber in sliding contact with the inner periphery of the same cylinder 104 and connected to a source of vacuum not shown, 110 and 110A are water-collecting pans, 111 is any device adapted to deliver to entrance nip 112 a stream of paper-making fibre slurry of desired concentration, thickness and speed and 113 is the formed web.

The apparatus may be driven by a single drive through one rotating member such as cylinder 104 or through two or more rotating members such as cylinders 103 and 104 by means of interlocking synchronized drives such that the linear surface speeds of all coacting members are substantially equal.

By comparison with FIGURES 1 to 3 it will be appreciated that the principles of operation are similar. In FIGURES 7, the disposition of the component members have been inverted bottom to top, the stream of slurry now entering the apparatus near the bottom and in a more nearly horizontal position, and the formed web leaving the apparatus near the top. Also the functions of cylinders 15 and 17 of FIGURES 1 to 3 have been brought together in the single cylinder 104 of FIG. 7, thus making for simpler constructions and for a more compact apparatus.

In FIGURE 7, stationary chamber 116 in sliding contact with the inner periphery of cylinder 103 may be omitted. When used, it fulfills the same function as chamber 60 in FIGURE 4.

As in FIGURE 5, pressure chamber 108 may be subdivided into plurality of smaller chambers permitting the use of graduated pressures in the successive chambers.

Figure 8:
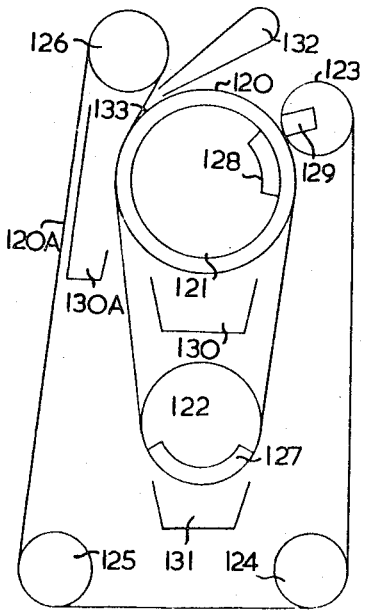
FIGURE 8 is a sectional elevation view illustrating a different embodiment of the invention.

In FIGURE 8, band 129 encircles parts of foraminous cylinders 121 and 122. Band 121 travels in contact with band 120 around part of the periphery of cylinder 121 to give the first zone, then belts 120 and 121 pass around part of cylinder 122 to provide the second zone and then return to cylinder 121 to provide the third zone, rolls 123, 124, 125 and 126 carry band 121. Pressure box 127 is located in cylinder 122 to provide the second zone, suction box 128 in cylinder 121 provides the third zone and suction box 129 strips the web from band 120. Suitable receptacles 129, 130 and 131 are provided to catch the water expelled outwardly in the first zone, expelled inwardly in the first zone, and expelled outwardly in the second zone respectively. Headbox 132 supplies pulp to nip 133. Roll 134 guides bands 120 and 121 to increase their bearing area against cylinders 121 and 122.

We claim:

1. An apparatus for making formed fibrous webs comprising at least two rotatable cylinders having foraminous surfaces, first and second continuous foraminous bands which converge to provide an entrance nip for the reception of stock, said foraminous bands being arranged to travel around part of the periphery of one of said cylinders to provide a first zone in which water is expressed outwardly with repect to said one cylinder and inwardly to be stored in said one cylinder, and said foraminous bands being arranged to travel together from one of said cylinders to the second of said cylinders and around part of the periphery of the second of said cylinders, means in the second of said cylinders for applying an airflow at a low pressure differential acting outwardly of the second of said cylinders being insufficient to separate the bands from the second of said cylinders or to damage the web, said means applying an airflow establishing a second zone and said foraminous bands being arranged to guide the web to a third zone, said third zone comprising means for establishing an air flow acting inwardly with respect to a cylinder having a foraminous surface, the air flow in said third zone being at a high pressure differential for the extraction of additional moisture from the web, means for collecting water expressed outwardly in the first and second zones and means exterior to the first cylinder and peripherally displaced from the first zone in the direction of movement of the surface of the first cylinder for receiving from the first cylinder water expressed inwardly into the first cylinder in the first zone.

2. An apparatus as in claim 1 in which a third zone is at the periphery of a third cylinder with a foraminous surface.

3. An apparatus as in claim 1 in which the third zone is at the periphery of said second cylinder.

4. An apparatus as in claim 1 in which the third zone is at the periphery of said first cylinder.

5. An apparatus as in claim 1 in which the second zone is provided by multiple pressure chambers, each having means to maintain a pressure differential independent of the others.

6. An apparatus as in claim 1 in which the third zone is provided by multiple vacuum chambers each having means to maintain a pressure differential independent of the others.

7. An apparatus as in claim 1 in which said first cylinder includes a chamber connected to means for selectively establishing a vacuum and superatmospheric pressure to control the balance of inward and outward expression of water in the first zone.

8. A method of making a formed web comprising the steps introducing a stream of pulp into the entrance nip provided between two converging endless bands, compressing the pulp between said bands in a first zone to express water through the surfaces of both bands, collecting the water expressed in one direction in a receptacle and storing the water expressed in the other direction in a foraminous member, transferring the water stored in the foraminous member by movement of the surface of the foraminous member to a location remote from the bands and then discharging it from the foraminous member to a receptacle, causing the foraminous bands to travel together to a second zone, and applying a pneumatic pressure differential to cause an air flow through the web and at least one of the bands.

9. An apparatus for making formed fibrous webs comprising at least two rotatable cylinders having foraminous surfaces, first and second continuous formainous bands which converge to provide an entrance nip for the reception of stock, said foraminous bands being arranged to travel around part of the periphery of one of said cylinders to provide a first zone in which water is expressed outwardly with respect to said one of said cylinders and inwardly to be stored in said one of said cylinders and said foraminous bands being arranged to travel together from said one of said cylinders to the second of said cylinders and around part of the periphery of said second of said cylinders, means in said second of said cylinders applying an air flow acting outwardly of said second of said cylinders being at a pressure differential insufficient to separate the bands from the second of said cylinders or to damage the web, said means applying an air flow establishing a second zone and said foraminous bands being arranged to guide the web to a third zone comprising means for the extraction of additional moisture from the web, means for collecting water expressed outwardly in the first and second zones and means remote from the first zone exterior to the first cylinder and peripherally displaced from the first zone in the direction of movement of the surface of the first cylinder for receiving from the first cylinder water expressed inwardly into the first cylinder in the first zone.

References Cited by the Examiner

UNITED STATES PATENTS

| 2,418,600 | 4/1947 | Ostertag et al. | 162—370 |
| 2,823,593 | 2/1958 | Holden | 162—368 |
| 2,995,186 | 8/1961 | De Montigny | 162—317 |

FOREIGN PATENTS

| 246,048 | 1/1926 | Great Britain. |

DONALL H. SYLVESTER, *Primary Examiner.*

J. H. NEWSOME, *Assistant Examiner.*